(12) United States Patent
Kuwahara et al.

(10) Patent No.: US 12,179,512 B2
(45) Date of Patent: Dec. 31, 2024

(54) WHEEL, WHEEL SERIES, AND METHOD OF MANUFACTURING WHEEL SERIES

(71) Applicant: Kawasaki Motors, Ltd., Hyogo (JP)

(72) Inventors: Koji Kuwahara, Akashi (JP); Norikazu Matsumura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 480 days.

(21) Appl. No.: 17/549,878

(22) Filed: Dec. 14, 2021

(65) Prior Publication Data

US 2023/0182501 A1 Jun. 15, 2023

(51) Int. Cl.
*B60B 3/00* (2006.01)
*B60B 3/04* (2006.01)
*B60B 3/10* (2006.01)

(52) U.S. Cl.
CPC .............. *B60B 3/005* (2013.01); *B60B 3/044* (2013.01); *B60B 3/10* (2013.01)

(58) Field of Classification Search
CPC ............ B60B 3/005; B60B 3/10; B60B 3/044
See application file for complete search history.

(56) References Cited

U.S. PATENT DOCUMENTS

| | | | | |
|---|---|---|---|---|
| 4,763,392 | A | * | 8/1988 | Fogal ..................... B60B 21/02 29/402.02 |
| 7,530,644 | B2 | | 5/2009 | Hodges |
| 8,833,865 | B2 | * | 9/2014 | Niedermayer .......... B60B 21/00 301/51 |
| 2005/0241950 | A1 | * | 11/2005 | Chen .................... C09D 133/26 205/183 |
| 2013/0140874 | A1 | | 6/2013 | Fukaya |
| 2015/0042150 | A1 | | 2/2015 | Goto |
| 2015/0061354 | A1 | | 3/2015 | Tanaka |
| 2024/0010027 | A1 | * | 1/2024 | Chenault, III ............ B60B 3/10 |

FOREIGN PATENT DOCUMENTS

| | | | |
|---|---|---|---|
| GB | 2416355 A | * 1/2006 | ............... B05D 5/06 |
| JP | 4896163 B2 | 3/2012 | |
| JP | 2012-66691 A | 4/2012 | |
| JP | 2015-44551 A | 3/2015 | |
| WO | 2013/160997 A1 | 10/2013 | |

* cited by examiner

*Primary Examiner* — Jason R Bellinger
(74) *Attorney, Agent, or Firm* — XSENSUS LLP (57) ABSTRACT

A vehicle wheel includes a wheel substrate made of metal and a colored coating layer located on a surface of the wheel substrate. An outer side surface of the wheel includes a first region, a second region, and a groove located between the first and second regions. The colored coating layer covering the wheel substrate is located over the groove. A color of the surface of the wheel substrate is visible at least in the first or second region.

15 Claims, 10 Drawing Sheets

WHEEL, WHEEL SERIES, AND METHOD OF MANUFACTURING WHEEL SERIES

BACKGROUND

Technical Field

The present disclosure relates to a wheel, a wheel series, and a method of manufacturing a wheel series.

Description of the Related Art

U.S. Pat. No. 7,530,644 B2 discloses a wheel for use in a vehicle tire-wheel assembly. Wheels influence the visual impression of vehicles and are thus required to have high aesthetic quality. To produce wheels having different aesthetic designs, a different mold needs to be prepared for each wheel.

SUMMARY

A vehicle wheel according to one aspect of the present disclosure includes: a wheel substrate made of metal; and a colored coating layer located on a surface of the wheel substrate. An outer side surface of the wheel includes a first region, a second region, and a groove located between the first and second regions. The colored coating layer covering the wheel substrate is located over the groove. A color of the surface of the wheel substrate is visible at least in the first or second region.

A vehicle wheel series according to one aspect of the present disclosure includes: a first wheel including a first wheel substrate and a first colored coating layer located on a surface of the first wheel substrate; a second wheel including a second wheel substrate and a second colored coating layer located on a surface of the second wheel substrate, the second wheel having the same shape and size as the first wheel. An outer side surface of the first wheel and an outer side surface of the second wheel each include a predetermined region, the respective predetermined regions of the outer side surfaces of the first and second wheels being identical to each other. A color of the surface of the first wheel substrate is visible in the predetermined region of the first wheel. The second wheel substrate is covered by the second colored coating layer over the predetermined region of the second wheel.

A method of manufacturing a vehicle wheel series according to one aspect of the present disclosure includes: preparing wheel intermediate products, each wheel intermediate product including a wheel substrate and a colored coating layer located on a surface of the wheel substrate; producing a first wheel by removing a part of the colored coating layer from an outer side surface of a first wheel intermediate product of the wheel intermediate products and uncovering a part of the wheel substrate of the first wheel intermediate product; and producing a second wheel by removing a part of the colored coating layer from an outer side surface of a second wheel intermediate product of the wheel intermediate products and uncovering a part of the wheel substrate of the second wheel intermediate product in such a manner that an area covered by the colored coating layer in the second wheel is different from an area covered by the colored coating layer in the first wheel.

DETAILED DESCRIPTION OF THE EMBODIMENTS

Hereinafter, exemplary embodiments will be described with reference to the drawings.

First Embodiment

Figure 1:
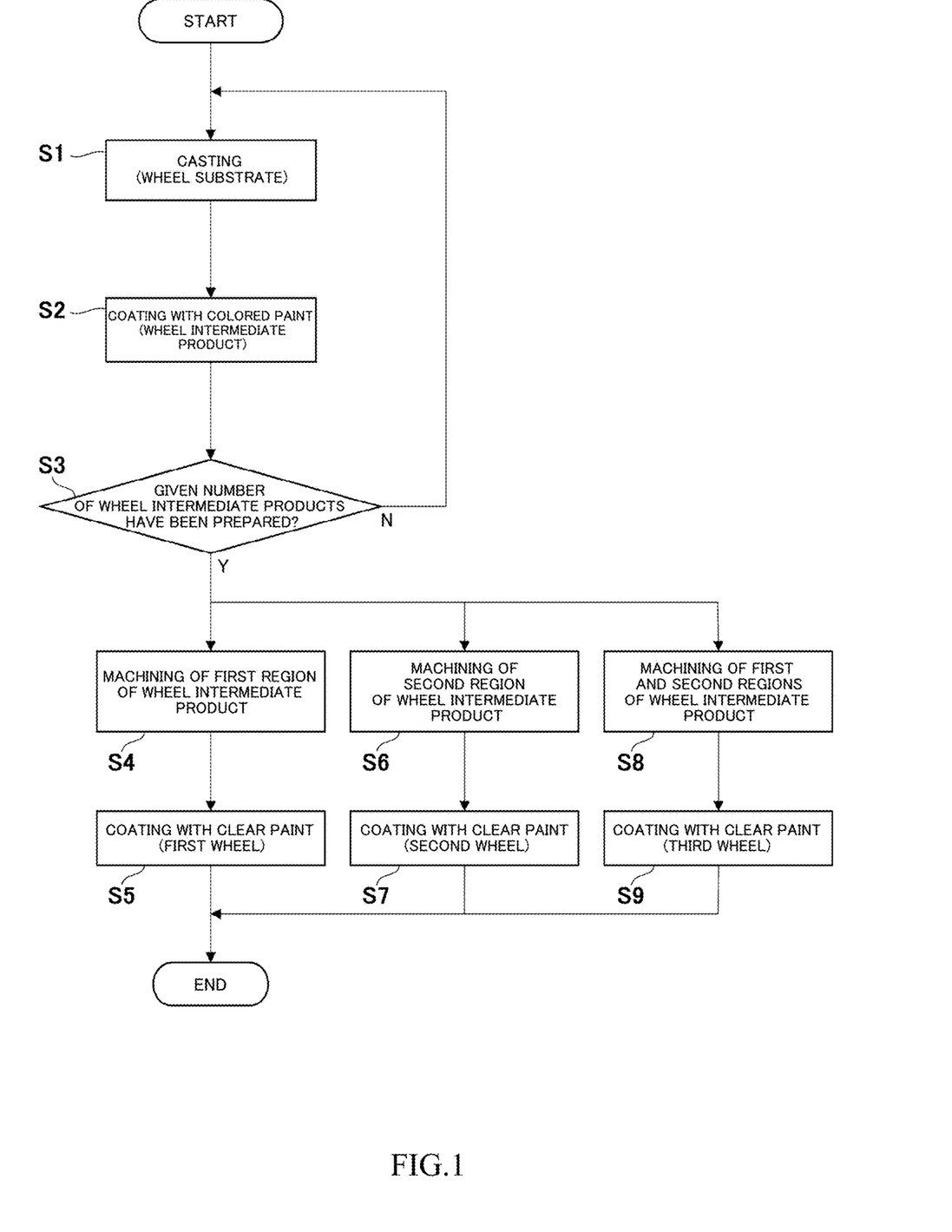
FIG. 1 is a flowchart of a manufacturing process of a wheel series according to a first embodiment.

FIG. 1 is a flowchart of a manufacturing process of a wheel series according to a first embodiment. Hereinafter, the manufacturing process of the wheel series will be described in line with the flowchart of FIG. 1 and with reference to other figures. First, wheel substrates 10 (see FIG. 5) made of a metal material such as an aluminum alloy are cast using molds of the same type (step S1). The wheel substrates 10 have the same shape and size. The shape of the wheel substrates 10 is close to the final shape of vehicle wheels to be produced. The cast wheel substrates 10 are subjected to fine-adjustment processing and heat treatment.

Subsequently, the wheel substrates 10 are painted in the same manner to coat the surface of each wheel substrate 10 with a non-transparent, colored coating layer 11 (see also FIG. 5) by which the coated surface is colored (step S2). The colored coating layer 11 preferably has a dark color with a brightness of 0% to less than 50% and is, for example, black. The color of the colored coating layer 11 is not limited to such a dark color, and may have any hue, saturation, and brightness sufficient to hide the intrinsic color of the surface of the coated product. The wheel substrate 10 coated with the colored coating layer 11 is prepared as a wheel intermediate product 1 (see FIG. 2). The wheel intermediate products 1 thus prepared have the same shape and size and include the same colored coating layers 11. Steps S1 and S2 are repeated until a given number of wheel intermediate products 1 are prepared (step S3).

Figure 2:
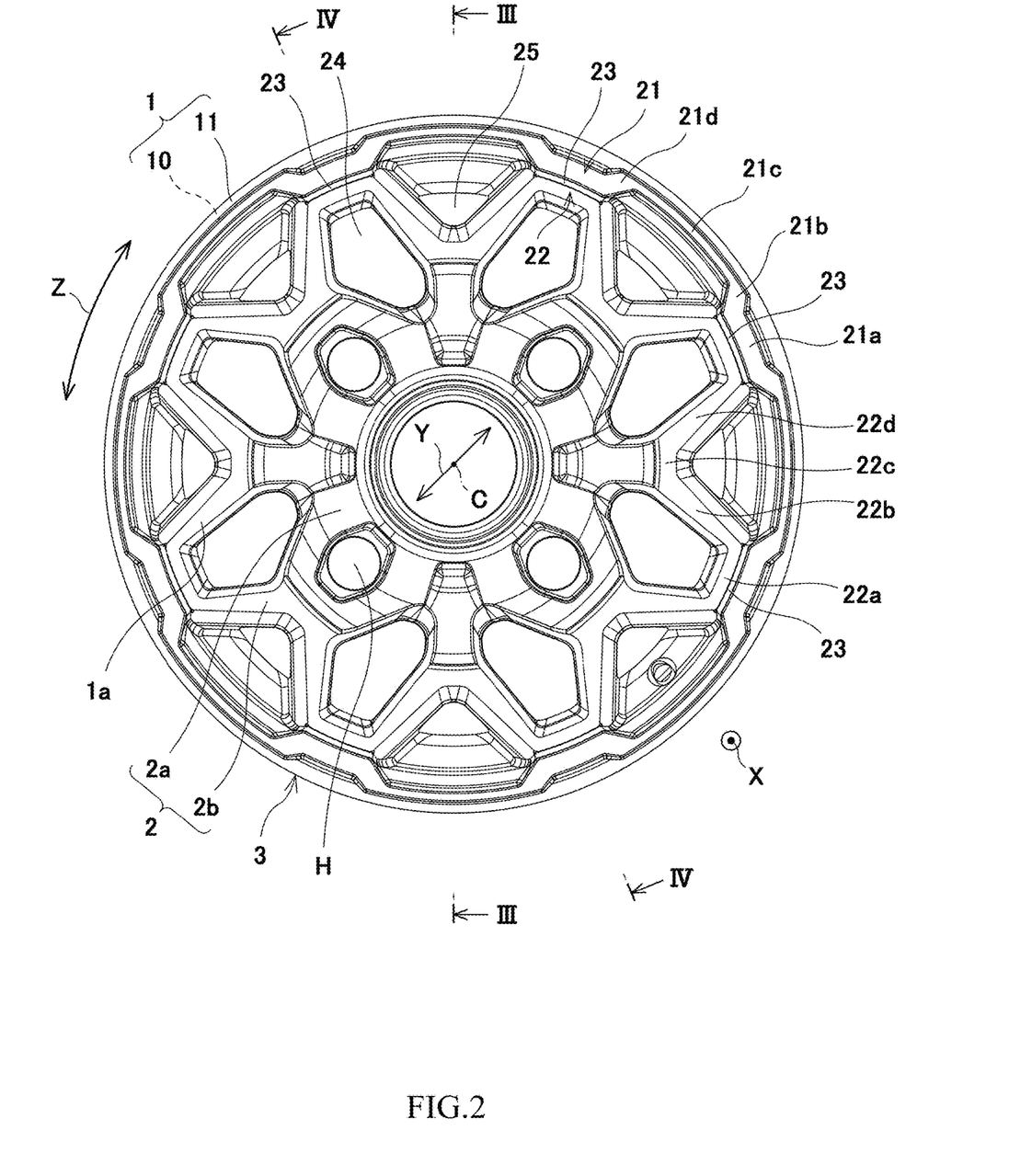
FIG. 2 is an outer side view of a wheel intermediate product according to the first embodiment.

FIG. 2 is an outer side view of the wheel intermediate product 1 according to the first embodiment. The wheel intermediate product 1 is used to produce a wheel of a four-wheeled vehicle. The wheel intermediate product 1 includes a disc 2 and a rim 3. The disc 2 extends inward from the rim 3 in a radial direction Y. The outer edge of the disc 2 in the radial direction Y is continuous with the rim 3. The disc 2 and rim 3 are formed together by one-piece molding. The disc 2 extends in the radial direction Y perpendicular to the direction in which the axis C of the wheel intermediate product 1 extends (this direction will be referred to as "axial direction X" hereinafter). The rim 3 is the outermost portion of the wheel intermediate product 1 in the radial direction Y, and is in the shape of a cylinder whose circumference extends about the axis C. A tire is mounted on the rim 3.

The disc 2 includes a base structure 2a and a spoke structure 2b. The base structure 2a is the innermost portion of the wheel intermediate product 1 in the radial direction Y, and is generally in the shape of a cylinder whose circumference extends about the axis C. The base structure 2a includes bolt holes H. Bolts are inserted into the bolt holes H to secure the base structure 2a to a hub mounted on an axle of a vehicle. The spoke structure 2b extends outward from the base structure 2a in the radial direction Y and is continuous with the rim 3.

In the wheel intermediate product 1, the colored coating layer 11 formed on the surface of the wheel substrate 10 has a substantially uniform thickness. Thus, the outer shape of the wheel intermediate product 1 is almost the same as that of the wheel substrate 10. That is, an outer side surface 1a of the wheel intermediate product 1 is almost the same as an outer side surface 10a of the wheel substrate 10. The term "outer side surface" as used herein refers to a side surface extending in the radial direction Y, the side surface being an aesthetically designed surface that faces outward in a vehicle equipped with the wheel.

The outer side surface 1a of the wheel intermediate product 1 includes a first region 21, a second region 22, and grooves 23. The outer side surface of the wheel substrate 10 includes a first region having substantially the same shape as the first region 21 of the wheel intermediate product 1, a second region having substantially the same shape as the second region 22 of the wheel intermediate product 1, and grooves having substantially the same shape as the grooves 23 of the wheel intermediate product 1. The grooves 23 are located between the first and second regions 21 and 22. The first and second regions 21 and 22 are aligned with each other in the radial direction Y. The first and second regions 21 and 22 are adjacent to each other, with the grooves 23 interposed therebetween. The first and second regions 21 and 22 are in close proximity to each other in the vicinity of the grooves 23. The first region 21 is located outside the second region 22 in the radial direction Y.

The entire first region 21 is located in the outer side surface of the rim 3. The surface of the first region 21 is flat. The first region 21 is in the shape of a closed loop whose circumference extends in the circumferential direction Z about the axis C. The first region 21 includes circumferential segments each including first, second, third, and fourth portions 21a, 21b, 21c, and 21d. In each segment, the first portion 21a is located outside and adjacent to a corresponding one of the grooves 23 in the radial direction Y and extends in the circumferential direction Z. The second portion 21b is continuous with one end in the circumferential direction Z of the first portion 21a and extends outward in the radial direction Y. The third portion 21c is continuous with the outer end in the radial direction Y of the second portion 21b and extends in the circumferential direction Z. The fourth portion 21d is continuous with one end of the third portion 21c and extends inward in the radial direction Y. The inner end in the radial direction Y of the fourth portion 21d is continuous with the first portion 21a of another segment. The segments each including the series of first, second, third, and fourth portions 21a, 21b, 21c, and 21d are arranged continuously in the circumferential direction Z. Thus, the first region 21 extends in a zig-zag pattern in the circumferential direction Z.

The radially outer edge of the second region 22 is located in the outer side surface of the rim 3, and the rest of the second region 22 is located in the outer side surface of the spoke structure 2b of the disc 2. The surface of the second region 22 is flat. The second region 22 is in the shape of a closed loop whose circumference extends in the circumferential direction Z. The second region 22 includes circumferential segments each including third, fourth, fifth, and sixth portions 22a, 22b, 22c, and 22d. In each segment, the third portion 22a is located inside and adjacent to the groove 23 in the radial direction Y and extends in the circumferential direction Z. The length of the third portion 22a of the second region 22 in the circumferential direction Z is, for example, substantially the same as the length of the first portion 21a of the first region 21 in the circumferential direction Z. The fourth portion 22b is continuous with one end in the circumferential direction Z of the third portion 22a and extends inward in the radial direction Y. The fifth portion 22c is continuous with the inner end in the radial direction Y of the fourth portion 22b and extends in the circumferential direction Z. The sixth portion 22d is continuous with one end in the circumferential direction Z of the fifth portion 22c and extends outward in the radial direction Y. The outer end in the radial direction Y of the sixth portion 22d is continuous with the third portion 22a of another segment. The segments each including the series of third, fourth, fifth, and sixth portions 22a, 22b, 22c, and 22d are arranged continuously in the circumferential direction Z. That is, the second region 22 extends in a zig-zag pattern in the circumferential direction Z.

The grooves 23 are recesses located in the outer side surface 1a of the wheel intermediate product 1 and extending in the circumferential direction Z. The grooves 23 are arranged at intervals in the circumferential direction Z. The entire grooves 23 are located in the outer side surface of the rim 3. Each groove 23 is open at both ends in the circumferential direction Z. The dimension in the radial direction Y of the grooves 23, i.e., the width of the grooves 23, is constant. In the radial direction Y, the width of the grooves 23 is smaller than the width of the first portions 21a of the first region 21 and smaller than the width of the third portions 22a of the second region 22. The length in the circumferential direction Z of the grooves 23 is substantially the same as those of the first portions 21a of the first region 21 and the third portions 22a of the second region 22.

The wheel intermediate product 1 includes first windows 25 and second windows 24 in the outer side surface 1a, the first and second windows 24 and 25 being open in the axial direction X. Each first window 25 is located between the two adjacent grooves 23 in the circumferential direction Z and surrounded by the first and second regions 21 and 22. Specifically, the first windows 25 are defined by the portions of the first region 21 that are other than the first portions 21a and the portions of the second region 22 that are other than the third portions 22a. The second windows 24 are located inside the grooves 23 in the radial direction Y.

Figure 3:
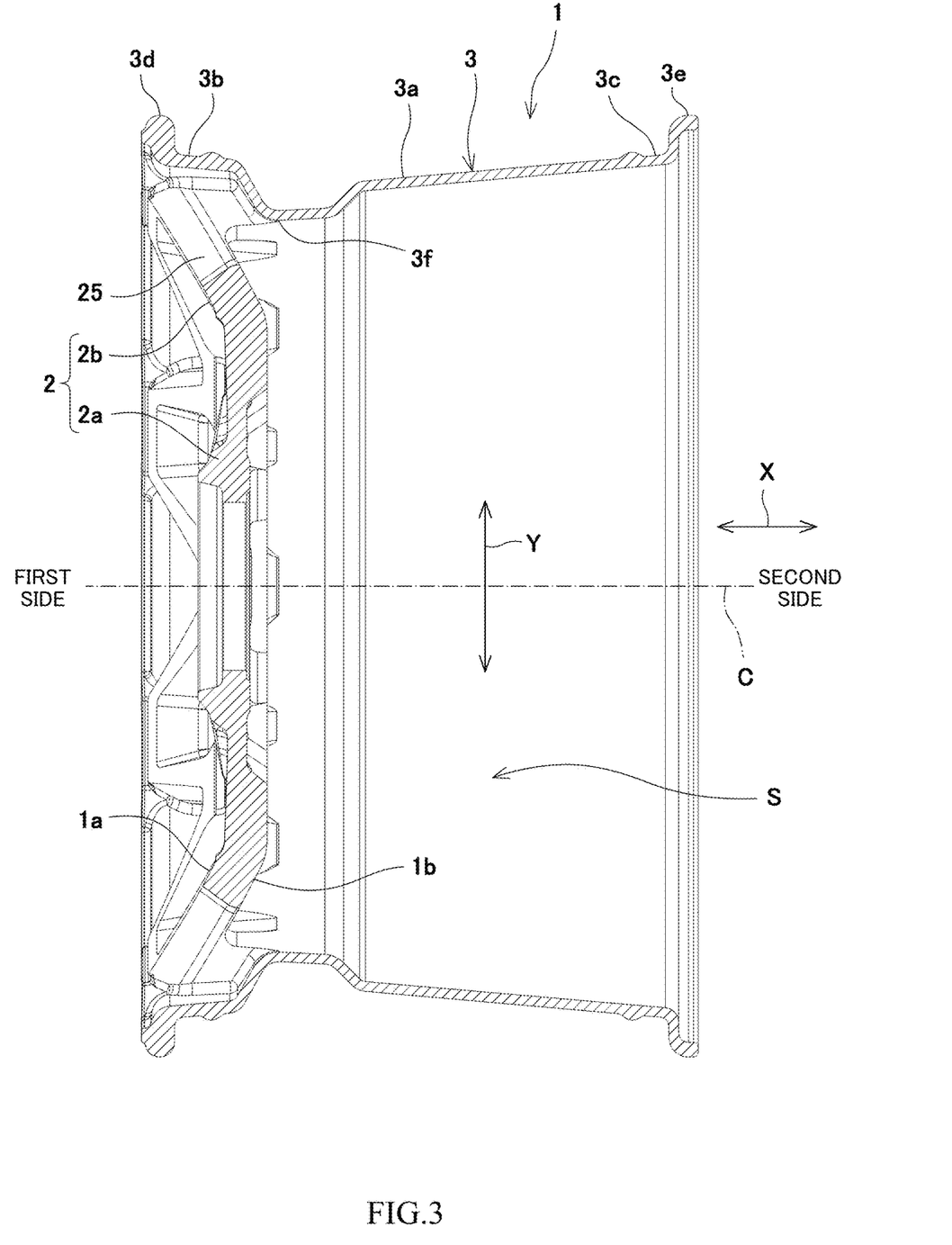
FIG. 3 is a cross-sectional view taken along the line of FIG. 2.

FIG. 3 is a cross-sectional view taken along the line of FIG. 2. FIG. 3 shows a cross-section taken in the radial direction Y and passing through the axis C. This cross-section does not pass through the grooves 23. As shown in FIG. 3, the rim 3 is longer than the disc 2 in the axial direction X. The disc 2 projects inward in the radial direction Y from the outer end in the axial direction X of the rim 3. The disc 2 is located in an internal space S of the rim 3. The disc 2 is closer to a first side in the axial direction X than the center of the internal space S. The outer side surface 1a of the wheel intermediate product 1 faces the first side. A second side in the axial direction X is opposite to the first side, and an inner side surface 1b of the wheel intermediate product 1 faces the second side. The term "inner side surface" refers to a surface that faces inward in the axial direction X in a vehicle equipped with the wheel.

In the cross-section taken in the radial direction Y and passing through the axis C, the outer side surface of the base structure 2a of the disc 2 is closer to the second side in the axial direction X than the end of the rim 3 that faces the first side in the axial direction X. The spoke structure 2b of the disc 2 extends obliquely inward in the radial direction Y toward the center in the axial direction X of the wheel intermediate product 1.

The rim 3 includes a well 3a, an outer bead seat 3b, an inner bead seat 3c, an outer flange 3d, and an inner flange 3e. The well 3a is a central portion of the rim 3 in the axial direction X and includes a recess recessed inward in the radial direction Y and extending in the circumferential direction Z. The outer bead seat 3b is adjacent to the well 3a in the axial direction X and closer to the first side in the axial direction X than the well 3a. An outer tire bead is seated on the outer beat seat 3b. The inner bead seat 3c is adjacent to the well 3a in the axial direction X and closer to the second side in the axial direction X than the well 3a. A tire inner bead is seated on the inner bead seat 3c. The outer flange 3d is adjacent to the outer bead seat 3b in the axial direction X and closer to the first side in the axial direction X than the outer bead seat 3b. The outer flange 3d projects outward in the radial direction Y. The inner flange 3e is adjacent to the inner bead seat 3c in the axial direction X and closer to the second side in the axial direction X than the inner bead seat 3c. The inner flange 3e projects outward in the radial direction Y.

The outer diameter of the outer and inner bead seats 3b and 3c are referred to as the "rim diameter". The inner diameter of the rim 3 varies in the axial direction X. The inner circumferential surface of the rim 3A includes a minimum diameter portion 3f where the inner diameter of the rim 3A is minimum, and the minimum diameter portion 3f is closer to the second side in the axial direction X than the outer flange 3d. The minimum diameter portion 3f of the inner circumferential surface of the rim 3 is included in the inner circumferential surface of the well 3a.

Figure 4:
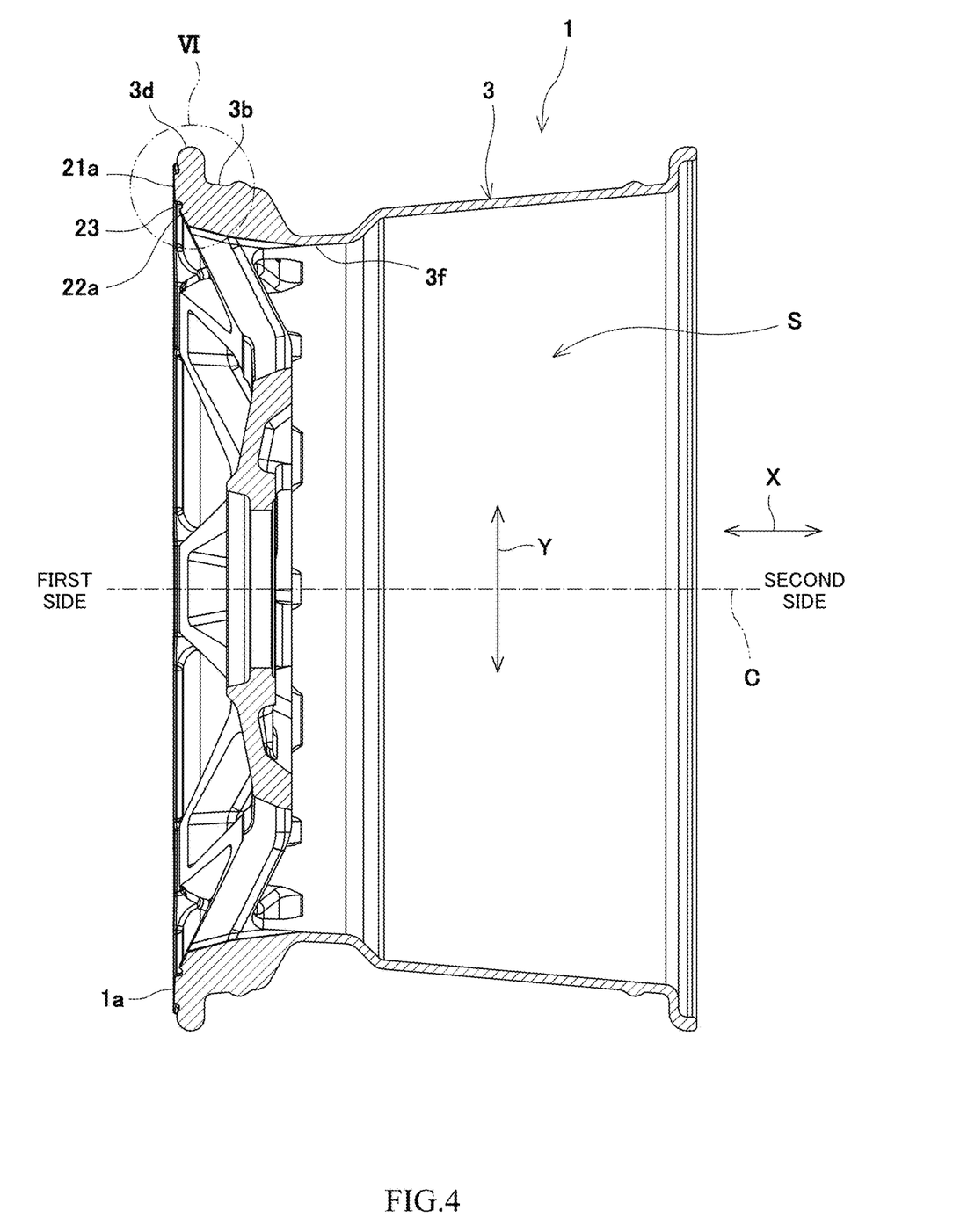
FIG. 4 is a cross-sectional view taken along the line IV-IV of FIG. 2.

FIG. 4 is a cross-sectional view taken along the line IV-IV of FIG. 2. FIG. 4 shows a cross-section taken in the radial direction Y and passing through the axis C. This cross-section passes through the grooves 23. As shown in FIG. 4, the grooves 23 are located outside the minimum diameter portion 3f of the inner circumferential surface of the rim 3 in the radial direction Y. The grooves 23 are located inside the outer circumferential surface of the outer bead seat 3b of the rim 3 in the radial direction Y. The third portions 22a of the second region 22 are located outside the minimum diameter portion 3f of the inner circumferential surface of the rim 3 in the radial direction Y. The thickness of the outer bead seat 3b in the cross-section of FIG. 4 is greater than the thickness of the outer bead seat 3b in the cross-section of FIG. 3.

Figure 5:
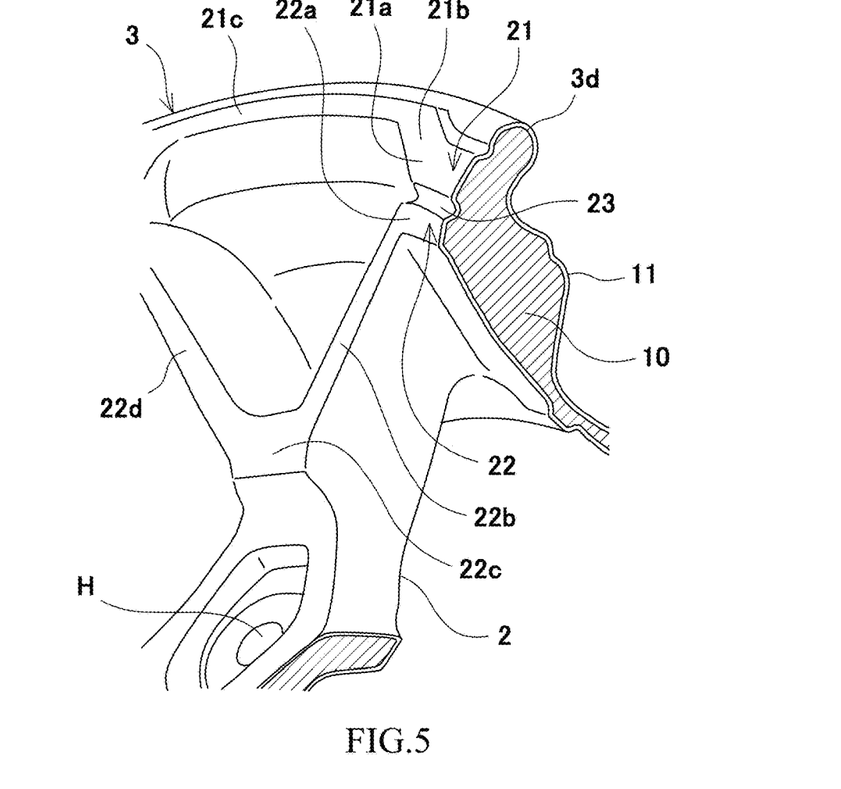
FIG. 5 is an enlarged cross-sectional perspective view of a portion VI of the wheel intermediate product of FIG. 4.
Figure 6:
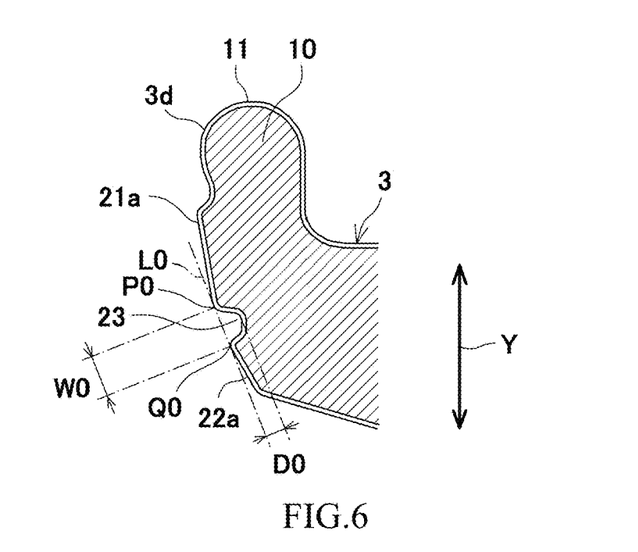
FIG. 6 is an enlarged cross-sectional view of the portion VI of the wheel intermediate product of FIG. 4.

FIG. 5 is an enlarged cross-sectional perspective view of a portion VI and its vicinity in the wheel intermediate product 1 of FIG. 4. FIG. 6 is an enlarged cross-sectional view of the portion VI of the wheel intermediate product 1 of FIG. 4. As shown in FIGS. 5 and 6 and as stated above, the groove 23 is located in the outer side surface of the rim 3. The groove 23 is U-shaped in cross-section. The angle of surface inclination of the first region 21 is different from the angle of surface inclination of the second region 22. The angle of surface inclination of the second region 22 with respect to the radial direction Y is greater than 1.5 times the angle of surface inclination of the first region 21 with respect to the radial direction Y and smaller than 4 times the angle of surface inclination of the first region 21 with respect to the radial direction Y. The first and second regions 21 and 22 extend obliquely inward in the radial direction Y toward the center in the axial direction X of the wheel intermediate product 1. In the cross-section of the wheel intermediate product 1 that is taken in the radial direction Y and that passes through the axis C, the angle of surface inclination of the second region 22 with respect to the radial direction Y is greater than the angle of surface inclination of the first region 21 with respect to the radial direction Y.

In the groove width direction perpendicular to the longitudinal direction of the groove 23, the width W0 of the groove 23 is, for example, from 2.0 to 9.0 mm and preferably from 3.0 to 7.0 mm. In the depth direction perpendicular to an imaginary line L0 drawn through the two ends P0 and Q0 of the groove 23 in the groove width direction, the depth D0 of the groove 23 is, for example, from 1.0 to 5.0 mm and preferably from 2.0 to 4.0 mm.

Referring back to FIG. 1, after the preparation of the given number of wheel intermediate products 1 (step S3), the process proceeds to the machining step of selectively removing a part of the colored coating layer 11 from the outer side surface 1a of each wheel intermediate product 1 to uncover a part of the wheel substrate 10.

Figure 7:
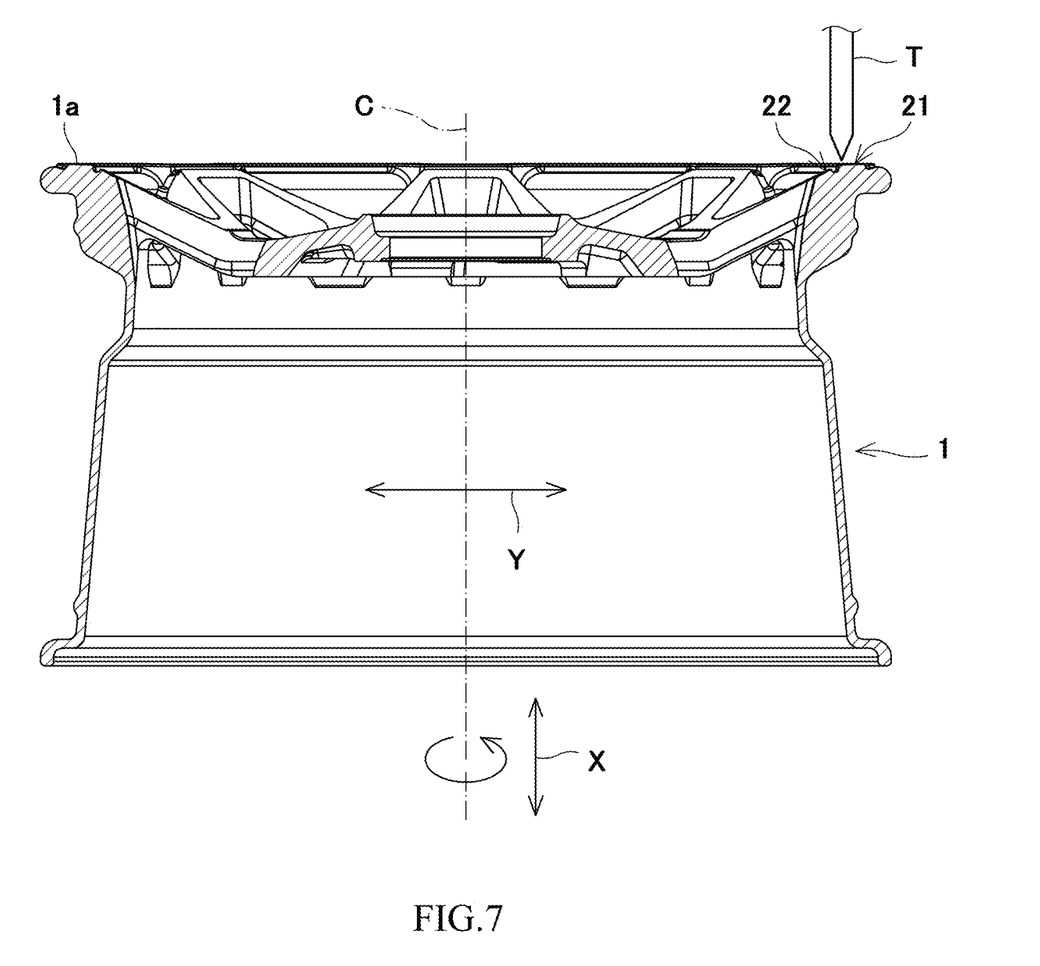
FIG. 7 is a cross-sectional view illustrating machining of the wheel intermediate product of FIG. 4.

FIG. 7 is a cross-sectional view illustrating machining of the wheel intermediate product 1 of FIG. 4. As shown in FIG. 7, the wheel intermediate product 1 is rotated about the axis C, and a machining tool T is placed against the first region 21 or second region 22 of the wheel intermediate product 1. The first and second regions 21 are spaced from each other in the radial direction Y and located on different circumferences in their entirety in the circumferential direction Z (see FIG. 2). Thus, either the first region 21 or second region 22 can be selectively machined by rotating the wheel intermediate product 1 against the machining tool T. Alternatively, the first region 21 or second region 22 may be machined by rotating the machining tool about its own axis and at the same time moving it translationally while keeping the wheel intermediate product 1 stationary.

In the machining step, the removal area of the colored coating layer 11 is varied among the wheel intermediate products 1 so that the area covered by the colored coating layer 11 differs among the resulting products. Thus, different kinds of wheels are produced. The produced wheels are different in visual appearance although having the same shape and size. Hereinafter, an example of production of a wheel series including three kinds of wheels (first to third wheels 51 to 53) will be described in line with FIG. 1 and with reference to other figures such as FIG. 2.

Figures 8A, 8B, 8C:
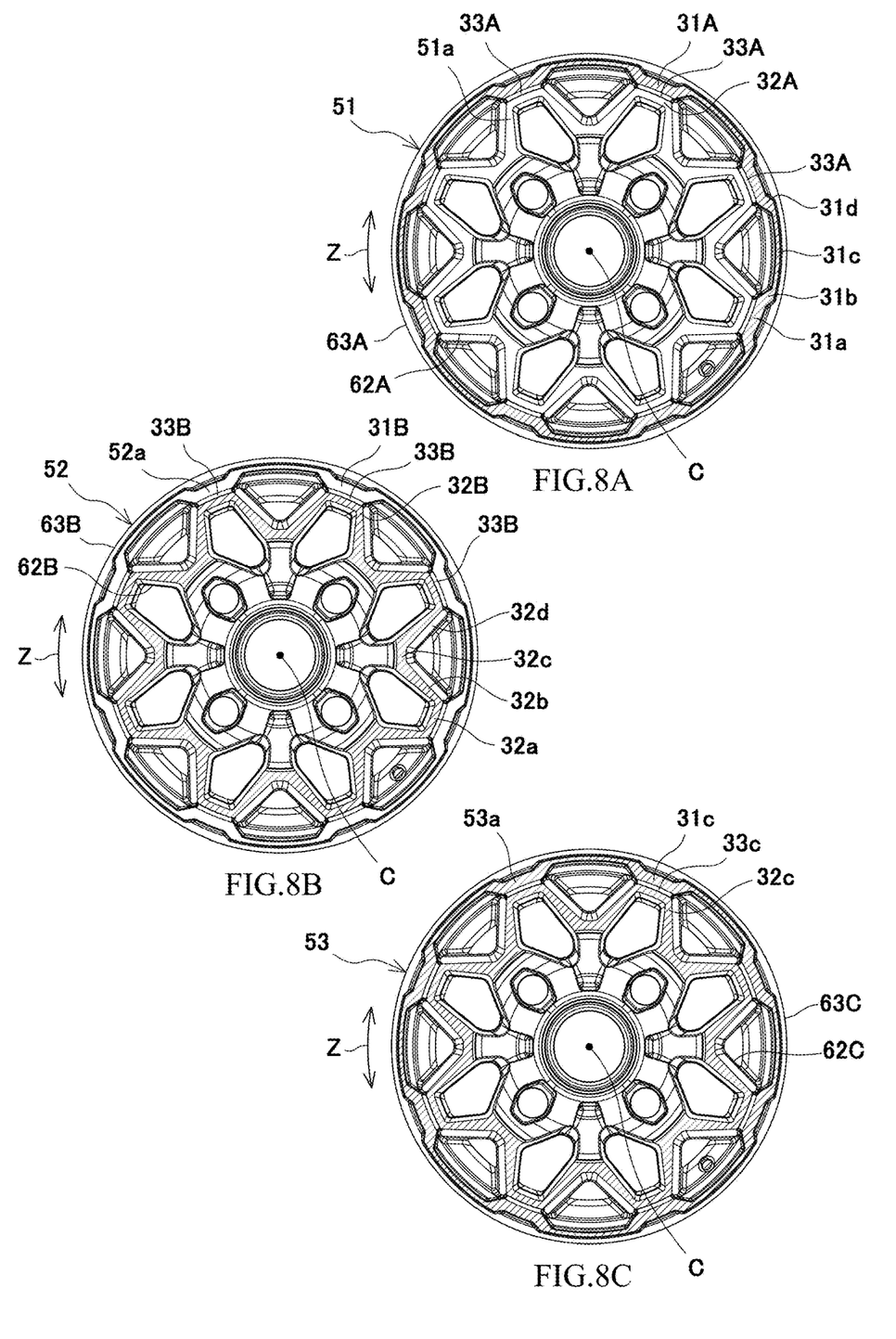
FIG. 8A is an outer side view of a first wheel.
FIG. 8B is an outer side view of a second wheel.
FIG. 8C is an outer side view of a third wheel.

The outer side surface 1a of the wheel intermediate product 1 for production of the first wheel 51 (this intermediate product is also referred to as "first wheel intermediate product"; see FIG. 8A) is subjected to machining, in which only the first region 21 is machined without machining the second region 22 (step S4). The grooves 23 are not machined. The amount of machining only needs to be such that the colored coating layer 11 of the first region 21 (this coating layer is also referred to as "first coating layer") is removed. That is, it is only required that the colored coating layer 11 be fully removed from the first region 21 and the wheel substrate 10 be uncovered over the entire first region 21. Thus, the amount of machining is defined so that the wheel substrate 10 may be machined to the minimum extent. After completion of the machining, the entire surface of the wheel is coated with a clear paint (step S5). As a result, the first wheel 51 coated with a transparent coating layer 12 is completed (see FIG. 8A).

Further, the outer side surface 1a of the wheel intermediate product 1 for production of the second wheel 52 (this intermediate product is also referred to as "second wheel intermediate product"; see FIG. 8B) is subjected to machining, in which only the second region 22 is machined without machining the first region 21 (step S6). The grooves 23 are not machined. The amount of machining only needs to be such that the colored coating layer 11 of the second region 22 (this coating layer is also referred to as "second coating layer") is removed. That is, it is only required that the colored coating layer 11 be fully removed from the second region 22 and the wheel substrate 10 be uncovered over the entire second region 22. After completion of the machining, the entire surface of the wheel is coated with a clear paint (step S7). As a result, the second wheel 52 coated with the transparent coating layer 12 is completed (see FIG. 8B).

Additionally, the outer side surface 1a of the wheel intermediate product 1 for production of the third wheel 53 (this intermediate product is also referred to as "third wheel intermediate product"; see FIG. 8C) is subjected to machining, in which both the first and second regions 21 and 22 are machined (step S8). The grooves 23 are not machined. The amount of machining only needs to be such that the colored coating layers 11 of the first and second regions 22 are removed. That is, it is only required that the colored coating layers 11 be fully removed from the first and second regions 21 and 22 and the wheel substrate 10 be uncovered over the entire first and second regions 21 and 22. After completion of the machining, the entire surface of the wheel is coated with a clear paint (step S9). As a result, the third wheel 53 coated with the transparent coating layer 12 is completed (see FIG. 8C).

The discs 62A to 62C and rims 63A to 63C of the wheels 51 to 53 are substantially the same as the disc 2 and rim 3 (see FIG. 2) of the wheel intermediate product 1, except for the area covered by the colored coating layer 11 and the addition of the transparent coating layer 12. Thus, the inner circumferential surfaces of the rims 63A to 63C of the wheels 51 to 53 are the same as the inner circumferential surface of the rim 3 of the wheel intermediate product 1, and have minimum diameter portions 3f identical to the minimum diameter portion 3f (see FIG. 3) of the wheel intermediate product 1.

Figure 9A:
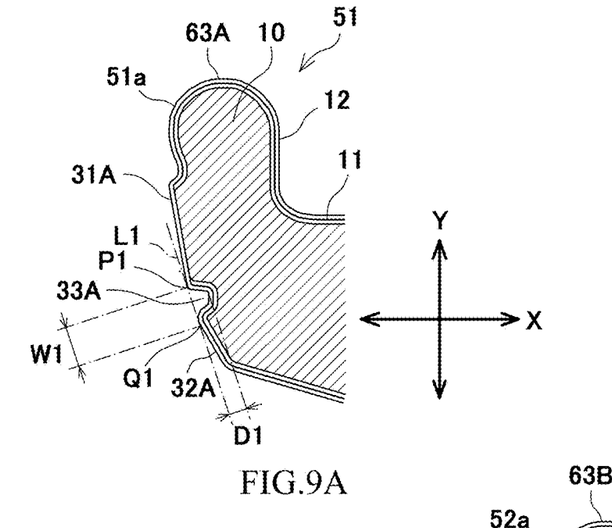
FIG. 9A is a cross-sectional view of a key part of the first wheel.

FIG. 8A is an outer side view of the first wheel 51. FIG. 9A is a cross-sectional view of a key part of the first wheel 51. The second region 22 of the first wheel intermediate product 1 is not machined. Thus, as shown in FIGS. 8A and 9A, a second region 32A of an outer side surface 51a of the first wheel 51 is the same as the second region 22 of the wheel intermediate product 1, except for being covered by the transparent coating layer 12. The second region 32A is a covered region where the colored coating layer 11 covers the wheel substrate 10. A first region 31A of the outer side surface 51a of the first wheel 51 is a region where the colored coating layer 11 has been removed. The first region 31A is a region corresponding to the first region 21 (see FIG. 2) of the wheel intermediate product 1, and is highlighted by hatching in FIG. 8A.

Specifically, first portions 31a in the first region 31A of the first wheel 51 correspond to the first portions 21a (see FIG. 2) in the first region 21 of the wheel intermediate product 1. Second portions 31b in the first region 31A of the first wheel 51 correspond to the second portions 21b (see FIG. 2) in the first region 21 of the wheel intermediate product 1. Third portions 31c in the first region 31A of the first wheel 51 correspond to the third portions 21c (see FIG. 2) in the first region 21 of the wheel intermediate product 1. Fourth portions 31d in the first region 31A of the first wheel 51 correspond to the fourth portions 21d (see FIG. 2) in the first region 21 of the wheel intermediate product 1.

The first region 31A is an uncovered region where the color of the surface of the wheel substrate 10 is visible as a result of the removal of the colored coating layer 11 covering the wheel substrate 10. The uncovered region, although not being covered by the colored coating layer 11, is coated with the transparent coating layer 12. In the first region 31A, the color of the surface of the wheel substrate 10 is externally visible through the transparent coating layer 12 due to the transparency of the transparent coating layer 12. The uncovered region extends continuously over the entire circumference of the first wheel 51 in the circumferential direction Z. In the second region 32A, the color of the colored coating layer 11 is externally visible through the transparent coating layer 12. The transparent coating layer 12 need not be completely transparent, and may have any hue, saturation, and brightness that allow the intrinsic color of the surface of the coated product to be visible through the coating layer 12.

In the first wheel 51, the angle of surface inclination of the first region 31A is different from the angle of surface inclination of the second region 32A. The angle of surface inclination of the second region 32A with respect to the radial direction Y is greater than 1.5 times the angle of surface inclination of the first region 31A with respect to the radial direction Y and smaller than 4 times the angle of surface inclination of the first region 31A with respect to the radial direction Y. The first and second regions 31A and 32A extend obliquely inward in the radial direction Y toward the center in the axial direction X of the first wheel 51. In the cross-section of the first wheel 51 that is taken in the radial direction Y and that passes through the axis C, the angle of surface inclination of the second region 32A with respect to the radial direction Y is greater than the angle of surface inclination of the first region 31A with respect to the radial direction Y.

The grooves 23 (see FIG. 2) of the wheel intermediate product 1 remain as grooves 33A in the outer side surface 51a of the first wheel 51 resulting from the machining. The width W1 of the groove 33A is, for example, from 1.5 to 8.0 mm and preferably from 2.5 to 6.0 mm. In the depth direction perpendicular to an imaginary line L1 drawn through the two ends P1 and Q1 of the groove 33A in the groove width direction, the depth D1 of the groove 33A is, for example, from 0.5 to 4.5 mm and preferably from 1.5 to 3.5 mm. The boundary between the first region 31A and groove 33A is likely to be relatively sharp due to the influence of the machining. Thus, the angle between the first region 31A and groove 33A is smaller than the angle between the second region 32A and groove 33A.

Figure 9B:
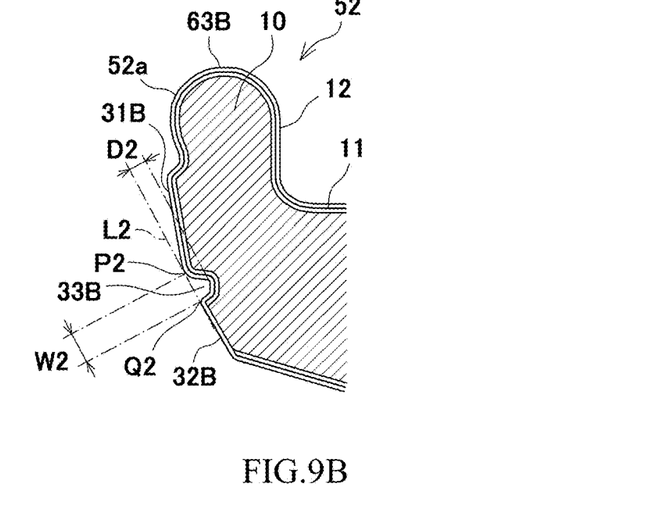
FIG. 9B is a cross-sectional view of a key part of the second wheel.

FIG. 8B is an outer side view of the second wheel 52. FIG. 9B is a cross-sectional view of a key part of the second wheel 52. The first region 21 of the second wheel intermediate product 1 is not machined. Thus, as shown in FIGS. 8B and 9B, a first region 31B of an outer side surface 52a of the second wheel 52 is the same as the first region 21 of the wheel intermediate product 1, except for being coated with the transparent coating layer 12. The first region 31B is a covered region where the colored coating layer 11 covers the wheel substrate 10. A second region 32B of the outer side surface 52a of the second wheel 52 is a region where the colored coating layer 11 has been removed. The second region 32B is a region corresponding to the second region 22 (see FIG. 2) of the wheel intermediate product 1, and is highlighted by hatching in FIG. 8B.

Specifically, third portions 32a in the second region 32B of the second wheel 52 correspond to the third portions 22a (see FIG. 2) in the second region 22 of the wheel intermediate product 1. Fourth portions 32b in the second region 32B of the second wheel 52 correspond to the fourth portions 22b (see FIG. 2) in the second region 22 of the wheel intermediate product 1. Fifth portions 32c in the second region 32B of the second wheel 52 correspond to the fifth portions 22c (see FIG. 2) in the second region 22 of the wheel intermediate product 1. Sixth portions 32d in the second region 32B of the second wheel 52 correspond to the sixth portions 22d (see FIG. 2) in the second region 22 of the wheel intermediate product 1.

The second region 32B is an uncovered region where the color of the surface of the wheel substrate 10 is visible as a result of the removal of the colored coating layer 11 covering the wheel substrate 10. The uncovered region extends continuously over the entire circumference of the second wheel 52 in the circumferential direction Z. The uncovered region, although not being covered by the colored coating layer 11, is coated with the transparent coating layer 12. In the second region 32B, the color of the surface of the wheel substrate 10 is externally visible through the transparent coating layer 12 due to the transparency of the transparent coating layer 12. In the first region 31B, the color of the colored coating layer 11 is externally visible through the transparent coating layer 12.

In the second wheel 52, the angle of surface inclination of the first region 31B is different from the angle of surface inclination of the second region 32B. The angle of surface inclination of the second region 32B with respect to the radial direction Y is greater than 1.5 times the angle of surface inclination of the first region 31B with respect to the radial direction Y and smaller than 4 times the angle of surface inclination of the first region 31B with respect to the radial direction Y. The first and second regions 31B and 32B extend obliquely inward in the radial direction Y toward the center in the axial direction X of the second wheel 52. In the cross-section of the second wheel 52 that is taken in the radial direction Y and that passes through the axis C, the angle of surface inclination of the second region 32B with respect to the radial direction Y is greater than the angle of surface inclination of the first region 31B with respect to the radial direction Y.

The grooves 23 (see FIG. 2) of the wheel intermediate product 1 remain as grooves 33B in the outer side surface 52a of the second wheel 52 resulting from the machining. The width W2 of the groove 33B is, for example, from 1.5 to 8.0 mm and preferably from 2.5 to 6.0 mm. In the depth direction perpendicular to an imaginary line L2 drawn through the two ends P2 and Q2 of the groove 33B in the groove width direction, the depth D2 of the groove 33B is, for example, from 0.5 to 4.5 mm and preferably from 1.5 to 3.5 mm. The boundary between the second region 32B and groove 33B is likely to be relatively sharp due to the influence of the machining. Thus, the angle between the second region 32B and groove 33B is smaller than the angle between the first region 31B and groove 33B.

Figure 9C:
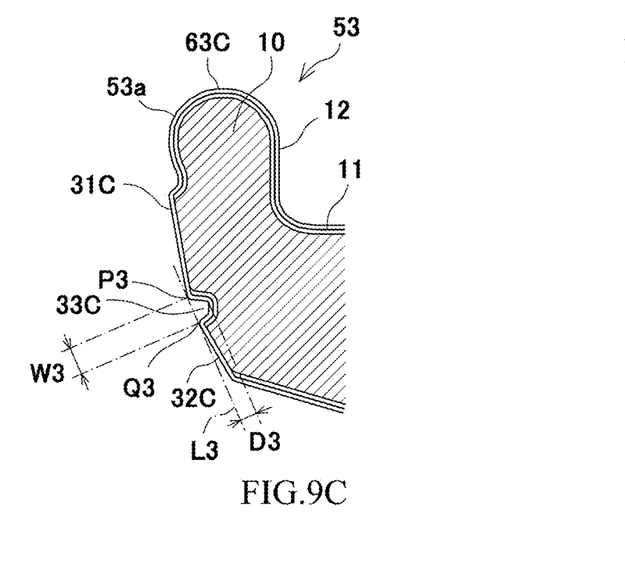
FIG. 9C is a cross-sectional view of a key part of the third wheel.

FIG. 8C is an outer side view of the third wheel 53. FIG. 9C is a cross-sectional view of a key part of the third wheel 53. As shown in FIGS. 8C and 9C, first and second regions 31C and 32C of an outer side surface 53a of the third wheel 53 are regions where the colored coating layer 11 has been removed. The first and second regions 31C and 32C are highlighted by hatching in FIG. 8C. The first region 31C corresponds to the first region 21 (see FIG. 2) of the wheel intermediate product 1, and the second region 32C corresponds to the second region 22 (see FIG. 2) of the wheel intermediate product 1. The first and second regions 31C and 32C are uncovered regions where the color of the surface of the wheel substrate 10 is not hidden by the colored coating layer 11 covering the wheel substrate 10. The uncovered regions, although not being covered by the colored coating layer 11, are coated with the transparent coating layer 12. In the first and second regions 31C and 32C, the color of the surface of the wheel substrate 10 is externally visible through the transparent coating layer 12 due to the transparency of the transparent coating layer 12.

In the third wheel 53, the angle of surface inclination of the first region 31C is different from the angle of surface inclination of the second region 32C. The angle of surface inclination of the second region 32C with respect to the radial direction Y is greater than 1.5 times the angle of surface inclination of the first region 31C with respect to the radial direction Y and smaller than 4 times the angle of surface inclination of the first region 31C with respect to the radial direction Y. The first and second regions 31C and 32C extend obliquely inward in the radial direction Y toward the center in the axial direction X of the third wheel 53. In the cross-section of the third wheel 53 that is taken in the radial direction Y and that passes through the axis C, the angle of surface inclination of the second region 32C with respect to the radial direction Y is greater than the angle of surface inclination of the first region 31C with respect to the radial direction Y.

The grooves 23 (see FIG. 2) of the wheel intermediate product 1 remain as grooves 33C in the outer side surface 53a of the third wheel 53 resulting from the machining. The width W3 of the groove 33C is, for example, from 1.7 to 7.8 mm and preferably from 2.3 to 5.8 mm. In the depth direction perpendicular to an imaginary line L3 drawn through the two ends P3 and Q3 of the groove 33C in the groove width direction, the depth D3 of the groove 33C is, for example, from 0.3 to 4.3 mm and preferably from 1.3 to 3.3 mm.

In the first wheel 51, as described above, the wheel substrate 10 is covered by the colored coating layer 11 over the grooves 33A, and the colored coating layer 11 is not located on the first region 31A, so that the color of the surface of the wheel substrate 10 is visible in the first region 31A. Thus, the first and second regions 31A and 32A are divided by the grooves 33A covered by the colored coating layer 11. As such, an aesthetic design with a clear distinction between the first and second regions 31A and 32A can be provided. Additionally, since the first and second regions 31A and 32A are separated from each other by the grooves 33A, it is easy to process the first and second regions 31A and 32A individually in the event that dimensional errors occur in the course of the wheel manufacturing.

In the second wheel 52, the wheel substrate 10 is covered by the colored coating layer 11 over the grooves 33B, and the colored coating layer 11 is not located on the second region 32B, so that the color of the surface of the wheel substrate 10 is visible in the second region 32B. Thus, the first and second regions 31B and 32B are divided by the grooves 33B covered by the colored coating layer 11. As such, an aesthetic design with a clear distinction between the first and second regions 31B and 32B can be provided.

Additionally, since the first and second regions 31B and 32B are separated from each other by the grooves 33B, it is easy to process the first and second regions 31B and 32B individually in the event that dimensional errors occur in the course of the wheel manufacturing.

In the third wheel 53, the wheel substrate 10 is covered by the colored coating layer 11 over the grooves 33C, and the colored coating layer 11 is not located on the first and second regions 31C and 32C, so that the color of the surface of the wheel substrate 10 is visible in the first and second regions 31C and 32C. Thus, the first and second regions 31C and 32C are divided by the grooves 33C covered by the colored coating layer 11. As such, an aesthetic design with a clear distinction between the first and second regions 31C and 32C can be provided. Additionally, since the first and second regions 31C and 32C are separated from each other by the grooves 33C, it is easy to process the first and second regions 31C and 32C individually in the event that dimensional errors occur in the course of the wheel manufacturing.

The grooves 23 of the wheel intermediate product 1 extend in the circumferential direction Z of the wheel intermediate product 1. Thus, the machining of the wheel intermediate product 1, in which the wheel intermediate product 1 is rotated about the axis against a machining tool, can be easily performed.

The angle between the uncovered region including the first region 31A (or second region 32B) and the groove 33A (or groove 33B) is smaller than the angle between the covered region including the second region 32A (or first region 31B) and the groove 33A (or groove 33B). Thus, an aesthetic difference between the uncovered and covered regions can be easily created.

Each of the first regions 31A to 31C and second regions 32A to 32C includes a portion extending in the circumferential direction Z and a portion extending in the radial direction Y. Thus, the region of the wheel substrate 10 that is not covered by the colored coating layer 11 is non-circular. As such, when the vehicle equipped with any of the wheels 51 to 53 is traveling, the rotation of the wheel 51, 52, or 53 is easy to visually perceive. This leads to high aesthetic quality of the wheels 51 to 53.

In each of the wheels 51 to 53, the uncovered region including the first region 31A or 31C or the second region 32B or 32C extends continuously over the entire circumference of the wheel 51, 52, or 53. As such, the uncovered and covered regions are easy to visually distinguish from each other when the wheel 51, 52, or 53 is rotating. This leads to high aesthetic quality of the wheels 51 to 53.

The angle of surface inclination of each of the first regions 31A to 31C is different from the angle of surface inclination of the corresponding one of the second regions 32A to 32C. Thus, reflection of light on each of the first regions 31A to 31C can be made different from reflection of light on the corresponding one of the second regions 32A to 32C. This leads to improved aesthetic quality of the wheels 51 to 53.

The angle of surface inclination of each of the second regions 32A to 32C with respect to the radial direction Y is greater than the angle of surface inclination of the corresponding one of the first regions 31A to 31C with respect to the radial direction Y. Thus, high aesthetic quality of the wheels 51 to 53 can be achieved while the wheels 51 to 53 are made compact.

The angle of surface inclination of each of the second regions 32A to 32C is greater than 1.5 times the angle of surface inclination of the corresponding one of the first regions 31A to 31C and smaller than 4 times the angle of surface inclination of the corresponding one of the first regions 31A to 31C. Thus, visual impression of each of the first regions 31A to 31C can be made different from visual impression of the corresponding one of the second regions 32A to 32C. This leads to high aesthetic quality of the wheels 51 to 53.

The first and second regions 21 and 22 of the wheel intermediate product 1 are adjacent to each other in the radial direction Y. Thus, the process of removing the colored coating layer 11 and uncovering the wheel substrate 10 in the first or second region 21 or 22 of the wheel intermediate product 1 can be easily accomplished by rotating the wheel intermediate product 1 against a machining tool.

Each of the grooves 33A to 33C is located outside the minimum diameter portion $3f$ of the inner circumferential surface of the corresponding one of the rims 63A to 63C in the radial direction Y. Thus, in each of the wheels 51 to 53, the first region 31A, 31B, or 31C and the second region 32A, 32B, or 32C are located as outer regions of the wheel 51, 52, or 53 in the radial direction Y. Thus, the wheels 51 to 53 can give the visual impression of being large in diameter.

The first regions 31A and 31C and second regions 32B and 32C from which the colored coating layer 11 has been removed are covered by the transparent coating layer 12. Thus, exposure of the wheel substrate 10 to air can be prevented while the material of the wheel substrate 10 is used for aesthetic purpose.

The region from which the colored coating layer 11 has been removed differs among the first to third wheels 51 to 53. Thus, the area covered by the colored coating layer 11 in the first wheel 51, the area covered by the colored coating layer 11 in the second wheel 52, and the area covered by the colored coating layer 11 in the third wheel 53 are different from one another. As such, the aesthetic designs of the first to third wheels 51 to 53 can be easily made different from one another while molds of the same type are used for production of the first to third wheels 51 to 53.

Second Embodiment

Figure 10:
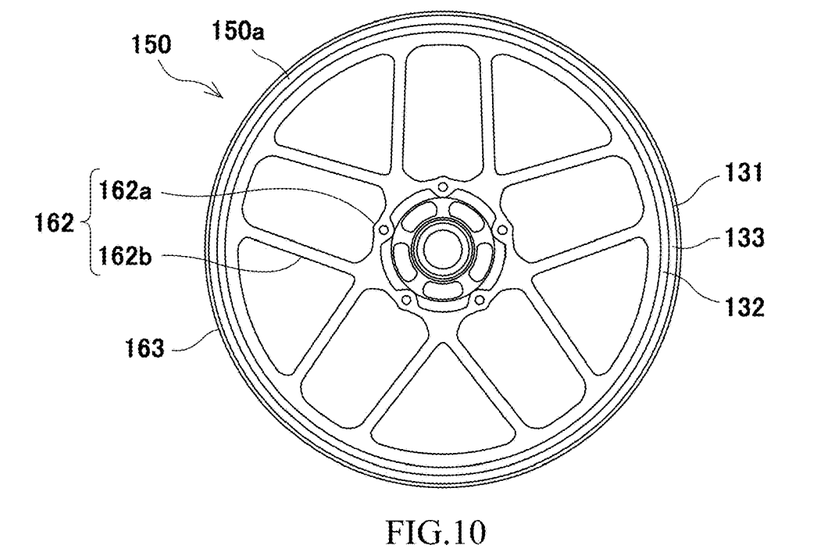
FIG. 10 is an outer side view of a wheel according to a second embodiment.
Figure 11:
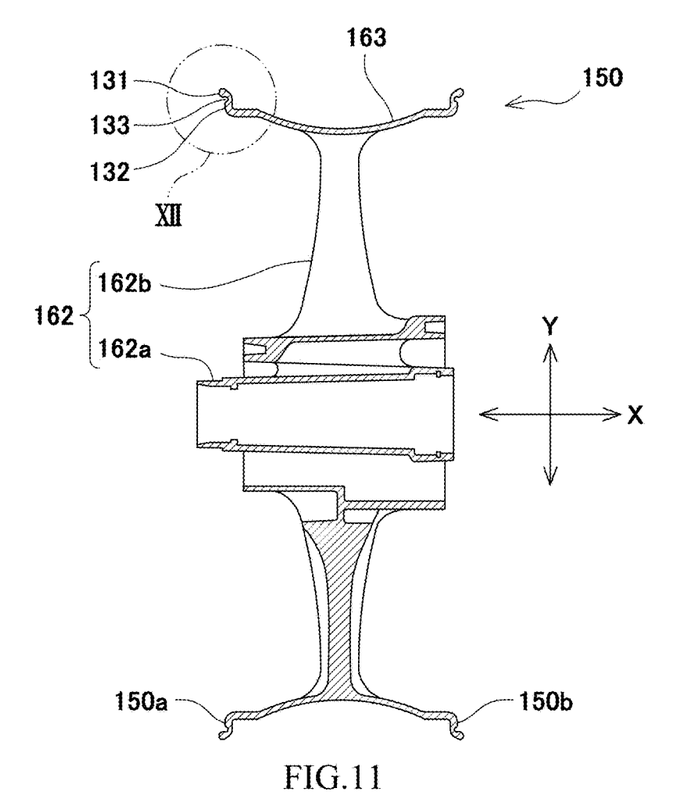
FIG. 11 is a cross-sectional view of the wheel of FIG. 10.

FIG. 10 is a side view of a wheel 150 according to a second embodiment. FIG. 11 is a cross-sectional view of the wheel 150 of FIG. 10. As shown in FIGS. 10 and 11, the wheel 150 is for use in a tire-wheel assembly of a two-wheeled vehicle. The wheel 150 includes a disc 162 and a rim 163. The disc 162 is located in the center of the wheel 150 in the axial direction X. The disc 162 includes a base structure 162a secured to an axle of the two-wheeled vehicle and a spoke structure 162b extending outward from the base structure 162a in the radial direction Y and connected to the center in the axial direction X of the rim 163.

The wheel 150 includes first and second side surfaces 150a and 150b facing in the axial direction X. The first and second side surfaces 150a and 150b are aesthetically designed surfaces that face outward in the two-wheeled vehicle equipped with the wheel 150. That is, both the first and second side surfaces 150a and 150b of the wheel 150 are outer side surfaces. The first side surface 150a of the wheel 150 includes a first region 131, a second region 132, and a groove 133. The entire first region 131, second region 132, and groove 133 are located in the outer side surface of the rim 163. The first region 131 is located outside the second region 132 in the radial direction Y. The groove 133 is located between the first and second regions 131 and 132 in the radial direction Y.

Figure 12:
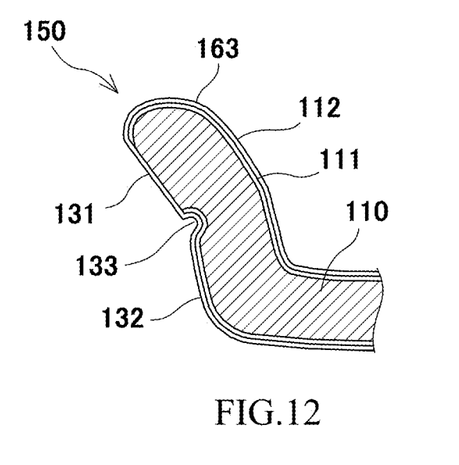
FIG. 12 is an enlarged cross-sectional view of a portion XII of the wheel of FIG. 11.

FIG. 12 is an enlarged cross-sectional view of a portion XII of the wheel 150 of FIG. 11. As shown in FIG. 12, the wheel 150 includes a wheel substrate 110 made of a metal material such as an aluminum alloy and a non-transparent, colored coating layer 111 covering the surface of the wheel substrate 110. In the first coating step of the manufacturing process of the wheel 150, the colored coating layer 111 is formed to cover the entire surface of the wheel substrate 110. In the subsequent machining step, the colored coating layer 111 is removed only from the first region 131. That is, the colored coating layer 111 is removed to uncover the wheel substrate 110 only in the first region 131. In the subsequent second coating step, the entire surface of the wheel is coated with a clear paint to form a transparent coating layer 112 on the outer side surface of the wheel 150. Thus, a first wheel is completed.

In the case where a second wheel differing in visual appearance from the first wheel is produced using the same wheel intermediate product as the first wheel, the colored coating layer 111 is removed only from the second region in the machining step to uncover the wheel substrate 110 only in the second region. In the case where a third wheel differing in visual appearance from the first wheel is produced using the same wheel intermediate product as the first wheel, the colored coating layer 111 is removed from both the first and second regions in the machining step to uncover the wheel substrate 110 in both the first and second regions. The other features of the wheels and the other procedures of the wheel manufacturing are the same as those in the first embodiment and will therefore not be described again.

In wheel series manufacturing using molds of the same type, the wheel intermediate product 1 need not have grooves 23. That is, the wheels 51A to MC need not have grooves 33A to 33C, and the first regions 31A to 31C may be directly adjacent to the second regions 32A to 32C. The coating with a clear paint in steps S5, S7, and S9 of FIG. 1 may be skipped so as not to form the transparent coating layer 12. The transparent coating layer 12 may be of the matte type rather than the clear type. The colored coating layer 11 may be transparent. The first regions 31A to 31C and second regions 32A to 32C may have the same angle of surface inclination. The first regions 31A to 31C or second regions 32A to 32C may be in the shape of a circle extending in the circumferential direction Z. The grooves 33A to 33C may extend in a direction other than the circumferential direction Z.

The above embodiments have been described to illustrate the technology disclosed in the present application. The technology of the present disclosure is not limited to the above embodiments, and is applicable also to embodiments obtained by making appropriate modifications, replacements, additions, and/or omissions to the above embodiments. The elements described in the above embodiments may be combined into other embodiments. For example, one or more elements or a method in one embodiment may be used in another embodiment. One or more elements in an embodiment may be arbitrarily extracted separately from the other elements in the embodiment. For the purpose of illustrating the technology, the elements disclosed in the attached drawings and the detailed description include not only elements essential for problem solution but also elements inessential for problem solution.

What is claimed is:

1. A vehicle wheel comprising:
    a wheel substrate made of metal; and
    a colored coating layer located on a surface of the wheel substrate, wherein
    an outer side surface of the wheel includes a first region, a second region, and a groove located between the first and second regions,
    the colored coating layer covering the wheel substrate is located over the groove, and
    a color of the surface of the wheel substrate is visible at least in the first or second region.

2. The vehicle wheel according to claim 1, wherein the groove extends in a circumferential direction of the wheel.

3. The vehicle wheel according to claim 1, wherein
    either the first or second region is an uncovered region where the color of the surface of the wheel substrate is visible,
    the other of the first and second regions is a covered region where the colored coating layer covers the wheel substrate, and
    an angle between the uncovered region and the groove is smaller than an angle between the covered region and the groove.

4. The vehicle wheel according to claim 1, wherein
    the first region includes a first portion extending in a circumferential direction of the wheel and a second portion extending in a radial direction of the wheel,
    the second region includes a third portion extending in the circumferential direction and a fourth portion extending in the radial direction, and
    the color of the surface of the wheel substrate is visible at least in a set of the first and second portions or a set of the third and fourth portions.

5. The vehicle wheel according to claim 1, wherein
    at least the first or second region is an uncovered region where the color of the surface of the wheel substrate is visible, and
    the uncovered region extends continuously over an entire circumference of the wheel in a circumferential direction about an axis of the wheel.

6. The vehicle wheel according to claim 1, wherein an angle of surface inclination of the first region is different from an angle of surface inclination of the second region.

7. The vehicle wheel according to claim 6, wherein
    the first region is located outside the second region in a radial direction of the wheel,
    the first and second regions extend obliquely inward in the radial direction toward an axial center of the wheel, and
    in a cross-section taken in the radial direction and passing through an axis of the wheel, the angle of surface inclination of the second region with respect to the radial direction is greater than the angle of surface inclination of the first region with respect to the radial direction.

8. The vehicle wheel according to claim 7, wherein the angle of surface inclination of the second region is greater than 1.5 times the angle of surface inclination of the first region and smaller than 4 times the angle of surface inclination of the first region.

9. The vehicle wheel according to claim 1, wherein the first and second regions are adjacent to each other in a radial direction of the wheel.

10. The vehicle wheel according to claim 1, wherein
    the wheel includes a cylindrical rim and a disc extending inward from the rim in a radial direction of the wheel, and
    the groove is located in an outer side surface of the rim.

11. The vehicle wheel according to claim 10, wherein the groove is located outside a minimum diameter portion of an inner circumferential surface of the rim in the radial direction.

12. The vehicle wheel according to claim 1, further comprising a transparent coating layer covering at least the first or second region in which the color of the surface of the wheel substrate is visible.

13. A vehicle wheel series comprising:
a first wheel including a first wheel substrate and a first colored coating layer located on a surface of the first wheel substrate; and
a second wheel including a second wheel substrate and a second colored coating layer located on a surface of the second wheel substrate, the second wheel having the same shape and size as the first wheel, wherein
an outer side surface of the first wheel and an outer side surface of the second wheel each include a predetermined region, the respective predetermined regions of the outer side surfaces of the first and second wheels being identical to each other,
a color of the surface of the first wheel substrate is visible in the predetermined region of the first wheel, and
the second wheel substrate is covered by the second colored coating layer over the predetermined region of the second wheel.

14. The vehicle wheel series according to claim 13, wherein
the outer side surface of the first wheel includes a first region, a second region, and a groove located between the first and second regions,
the outer side surface of the second wheel includes a first region, a second region, and a groove located between the first and second regions,
the predetermined regions of the first and second wheels are the first regions of the first and second wheels, respectively,
the first wheel substrate is covered by the first colored coating layer over the groove,
a color of the surface of the first wheel substrate is visible in the first region, and
the second wheel substrate is covered by the second colored coating layer over the groove and the first region.

15. A method of manufacturing a vehicle wheel series, comprising:
preparing wheel intermediate products, each wheel intermediate product including a wheel substrate and a colored coating layer located on a surface of the wheel substrate;
producing a first wheel by removing a part of the colored coating layer from an outer side surface of a first wheel intermediate product of the wheel intermediate products and uncovering a part of the wheel substrate of the first wheel intermediate product; and
producing a second wheel by removing a part of the colored coating layer from an outer side surface of a second wheel intermediate product of the wheel intermediate products and uncovering a part of the wheel substrate of the second wheel intermediate product such that an area covered by the colored coating layer in the second wheel is different from an area covered by the colored coating layer in the first wheel.

* * * * *